(12) United States Patent
Enzner

(10) Patent No.: US 7,054,437 B2
(45) Date of Patent: *May 30, 2006

(54) STATISTICAL ADAPTIVE-FILTER CONTROLLER

(75) Inventor: Gerald Enzner, Neuhof/Zenn (DE)

(73) Assignee: Nokia Corporation, Espoo (FI)

( * ) Notice: Subject to any disclaimer, the term of this patent is extended or adjusted under 35 U.S.C. 154(b) by 57 days.

This patent is subject to a terminal disclaimer.

(21) Appl. No.: 10/608,785

(22) Filed: Jun. 27, 2003

(65) Prior Publication Data

US 2004/0264686 A1   Dec. 30, 2004

(51) Int. Cl.
*H04M 9/08* (2006.01)
(52) U.S. Cl. .................... 379/406.08; 370/289
(58) Field of Classification Search ............ 379/406, 379/388.01, 406.08; 370/289
See application file for complete search history.

(56) References Cited

U.S. PATENT DOCUMENTS

| | | | | |
|---|---|---|---|---|
| 6,108,413 A | * | 8/2000 | Capman et al. ......... | 379/406.13 |
| 6,160,886 A | * | 12/2000 | Romesburg et al. ... | 379/406.05 |
| 6,658,107 B1 | * | 12/2003 | Sorqvist et al. ........ | 379/406.05 |
| 6,925,176 B1 | * | 8/2005 | Myllyla et al. ......... | 379/406.05 |

OTHER PUBLICATIONS

C. Breining, et al, Acoustic Echo Control—An Application of Very High-Order Adaptive Filters, IEEE Signal Processing Magazine, vol. 16, No. 4, pp. 42-69, Jul. 1999.

S. Haykin, Frequency-Domain and Subband Adaptive Filters, In: Adaptive Filter Theory, Prentice Hall, 4th Edition, 2002, Chapters 7.1 and 7.2.

E. Ferrara, Frequency-domain adaptive filtering, In: C. Cowan, P. Grant, Adaptive Filters, Prentice Hall, 1985, Chapter 6.

B. Nitsch, A frequency-selective stepfactor control for an adaptive filter algorithm working in the frequency domain, Signal Processing, vol. 80, pp. 1733-1745, 2000.

A. Mader, H. Puder, G. U. Schmidt, Step-Size Control for Acoustic Echo Cancellation Filters—An Overview, Signal Processing, vol. 80, No. 9, pp. 1697-1719, Sep. 2000.

E. Hansler, G. U. Schmidt, Hands-free telephones—joint control of echo cancellation and postfiltering, Signal Processing, vol. 80, No. 11, pp. 2295-2305, 2000.

G. Enzner, R. Martin, P. Vary, Partitioned Residual Echo Power Estimation for Frequency-Domain Acoustic Echo Cancellation and Postfiltering, European Trans. on Telecommunications, vol. 13, No. 2, pp. 103-114, Mar.-Apr. 2002.

(Continued)

*Primary Examiner*—Sinh Tran
*Assistant Examiner*—Walter F Briney, III

(57) ABSTRACT

This invention describes a statistical adaptive-filter controller for digital acoustic echo control in hands-free telephones for achieving more consistent echo cancellation results (i.e. higher output signal quality) and simpler realizations of AEC units. The improvement using the simple statistical adaptive-filter controller is accomplished by optimizing a joint control of an echo canceller and a postfilter.

22 Claims, 4 Drawing Sheets

OTHER PUBLICATIONS

G. O. Glentis, K. Berberidis, S. Theodoridis, Efficient Least Squares Adaptive Algorithms for FIR Transversal Filtering: a unified view, IEEE Signal Processing Magazine, pp. 13-41, Jul. 1999.

* cited by examiner

STATISTICAL ADAPTIVE-FILTER CONTROLLER

CROSS-REFERENCE TO RELATED APPLICATION

This application discloses subject matter which is also disclosed and which may be claimed in co-pending, co-owned application 60/483,265 filed on even date herewith.

This invention generally relates to a digital Acoustic Echo Control (AEC) in telephones and more specifically to introducing an additional statistical adaptive-filter controller for achieving more consistent echo cancellation results (i.e. higher output signal quality) and a simpler realization of AEC units than before.

BACKGROUND OF THE INVENTION

Field and Background of the Invention

The invention is related to a digital Acoustic Echo Control (AEC) unit of telephones. The purpose of the AEC is to prevent the far-end speaker's speech circulating back as an echo after coming out from the near-end phone user's loudspeaker and partly picked up by the phone's microphone. A general concept is illustrated in FIG. 1 where "i" denotes the sampling time index. Advanced AEC units contain an echo canceller module 21, generally consisting of an echo canceller 10 with a gradient adaptation means 12, and a postfilter 14 for residual echo suppression.

The need of an AEC unit in the hands-free telephones basically arises from an acoustic echo path with an impulse response $h(i)$ from a local loudspeaker 16 to a local microphone 18. The objective of the echo canceller 10 with an impulse response $w(i)$ is to find a replica of the echo path in order to compensate for an echo signal $d(i)$ 22 of a voice signal $x(i)$ 20 received by a loudspeaker 16 that provides an acoustic output signal in response to the voice signal $x(i)$ 20, thus generating in the microphone 18 the echo signal $d(i)$ 22 which is one of the components of a microphone signal $y(i)=d(i)+s(i)+n(i)$ 28, where $s(i)$ 24 is a microphone speech signal and $n(i)$ 26 is a background noise signal. As the system identification process is always performed in the presence of observation noise (local speech plus background noise) $s(i)+n(i)$, the objective of $w(i)=h(i)$ cannot be reached exactly. The echo canceller 10 generates an estimated echo signal $d'(i)$ 32 which is negatively added to the microphone signal 18 by an adder 30 which generates an echo reduced microphone signal $e(i)$ 34 containing the partially compensated echo signal. The echo reduced microphone signal $e(i)$ 34 is further provided to the gradient adaptation means 12 and to the postfilter 14. The gradient adaptation means 12 further provides a control signal 15 to the echo canceller 10 by determining a gradient of the control signal based on a predetermined criteria using the voice signal $x(i)$ 20 and the echo reduced microphone signal $e(i)$ 34 as input signals. The purpose of the postfilter 14 is further reducing of residual echo components of the echo reduced microphone signal $e(i)$ 34. The resulting output system signal $s'(i)n'(i)$ 36 after residual echo suppression by the postfilter 14 is then transmitted to the far speaker.

The basic principles of how to generate and control the echo canceller 10 and the postfilter 14 are well known. However, there are some problems involved in controlling them efficiently in a most optimal way. The key variable in the whole control issue is the residual echo, $b(i)=d(i)-d'(i)$ which, unfortunately, cannot be directly determined since it is inherently embedded in the echo reduced microphone signal $e(i)=b(i)+s(i)+n(i)$ 34.

The echo canceller module 21 of FIG. 1 often provides an insufficient estimate $d'(i)$ of the echo signal $d(i)$ 22. The postfilter 14 in the sending path of the telephone performs residual echo suppression, but in many solutions this is achieved at the cost of distortions (attenuations) of the useful signal $s(i)+n(i)$. In an alternative solution, the echo canceller module 21 can be used alone without a postfilter 14. This approach does not introduce noticeable signal distortions, but normally requires very sophisticated control mechanisms for the echo canceller. A more simple and effective approach is needed.

SUMMARY OF THE INVENTION

The object of the present invention it to provide an additional statistical adaptive-filter controller for achieving more consistent echo cancellation results and a simpler realization of an acoustic echo control in telephones.

According to a first aspect of the present invention, an echo cancellation system comprises a microphone, responsive to an echo signal from a loudspeaker that provides an acoustic output signal in response to a voice signal, for providing an echo signal which is a component of a microphone signal; and a statistical adaptive-filter controller, responsive to the voice signal and to an echo reduced microphone signal, for providing a first control signal to an echo canceller module and a second control signal to a postfilter; said control signals are provided for optimizing cancellation of the echo signal.

In further accord with the first aspect of the invention, the first control signal may be a step-size signal which is used to determine a gradient change of an echo transfer function signal provided to an echo canceller of the echo canceller module according to a predetermined criteria.

Still according to the first aspect of the invention, the second control signal may be a further transfer function signal of the postfilter, said further transfer function signal weights an echo reduced microphone signal.

According still further to the first aspect of the invention, the echo cancellation system further comprises the postfilter, responsive to an echo reduced microphone signal and to the second control signal, for providing an output system signal.

Still further according to the first aspect of the invention, the echo cancellation system further comprises the echo canceller module, responsive to the voice signal, to the first control signal, and to an echo reduced microphone signal, for providing an estimated echo signal to an adder. Further, the echo cancellation system may comprise an echo canceller, responsive to the voice signal and to an echo transfer function signal, for providing an estimated echo signal to the adder. Still further, the echo cancellation system may comprise a gradient adaptation means, responsive to the voice signal, to the first control signal, for providing for an echo transfer function signal to the echo canceller. Also furthers the echo cancellation system comprising the echo canceller module, further comprises the postfilter, responsive to an echo reduced microphone signal and to the second control signal, for providing an output system signal.

Further still according to the first aspect of the invention, the echo cancellation system further comprises an adder, responsive to a microphone signal and to an estimate echo signal, for providing an echo reduced microphone signal.

In further accordance with the first aspect of the invention, the statistical adaptive-filter controller, the echo canceller module and the postfilter may operate in a time or in a frequency domain, and said first and second control signals are provided in the time or in the frequency domain, respectively.

Yet further still according to the first aspect of the invention, the statistical adaptive-filter controller and the echo canceller module operates in a time domain and the postfilter operates in a frequency domain, and the first control signal is provided in the time domain and the second control signals is provided in the frequency domain, respectively.

According further to the first aspect of the invention, the statistical adaptive-filter controller, the echo canceller module and the postfilter operate in a frequency domain, and said first and second control signals are provided in the frequency domain as well, wherein said frequency domain is implemented as a Discrete Fourier Transform (DFT) domain. Further, statistical adaptive-filter controller implemented in the DFT domain may comprise a first power spectral density means responsive to the voice signal, providing for a first power spectral density signal of the voice signal; a second power spectral density means responsive to an echo reduced microphone signal, providing for a second power spectral density signal of the echo reduced microphone signal; and a statistical adaptive-filter estimator, responsive to the first and to the second power spectral density signals, providing for the first and for the second control signals. Still further, examples of calculating a step-size signal as the first control signal and a further transfer function signal as the second control signal are presented.

According to a second aspect of the invention, a method for acoustic echo control comprises the steps of: providing an echo signal which is a component of a microphone signal of a microphone which is responsive to an echo signal from a loudspeaker that provides an acoustic output signal in response to a voice signal; and providing a first control signal to an echo canceller module and a second control signal to a postfilter by a statistical adaptive-filter controller which is responsive to the voice signal and to an echo reduced microphone signal for optimizing echo cancellation of the echo signal.

According further to the second aspect of the invention, the first control signal may be a step-size signal which is used to determine a gradient change of an echo transfer function signal provided to an echo canceller of the echo canceller module according to a predetermined criteria.

Further according to the second aspect of the invention, the second control signal is a further transfer function signal of a postfilter, said further transfer function signal weights an echo reduced microphone signal.

Still further according to the second aspect of the invention, the method further comprises the steps of: coupling a sidetone adaptive signal to an earpiece during the phone call; and providing a sidetone sound audio signal to the user.

Further still in accordance with the second aspect of the invention, prior to the step of providing the first and second control signals the method further comprises the step of determining the first and the second control signals by a statistical adaptive-filter controller. Further, after the step of determining the first and the second control signals, the method further comprises the steps of: determining an estimated echo signal by the echo canceller module using the first control signal provided by the statistical adaptive-filter controller; and determining an echo reduced microphone signal by an adder by adding the estimate echo signal to a microphone signal. Still further, after the step of determining an echo reduced microphone signal by an adder, the method further comprises the step of determining an output system signal by the postfilter using the second control signal provided by the statistical adaptive-filter controller.

BRIEF DESCRIPTION OF THE DRAWINGS

For a fuller understanding of the nature and objects of the present invention, reference is made to the following detailed description taken in conjunction with the following drawings, in which.

BEST MODE FOR CARRYING OUT THE INVENTION

This invention generally discloses a statistical adaptive-filter controller for digital acoustic echo control in hands-free telephones for achieving more consistent echo cancellation results (thus a higher output signal quality) and simpler realizations of AEC units than before.

Figure 1:
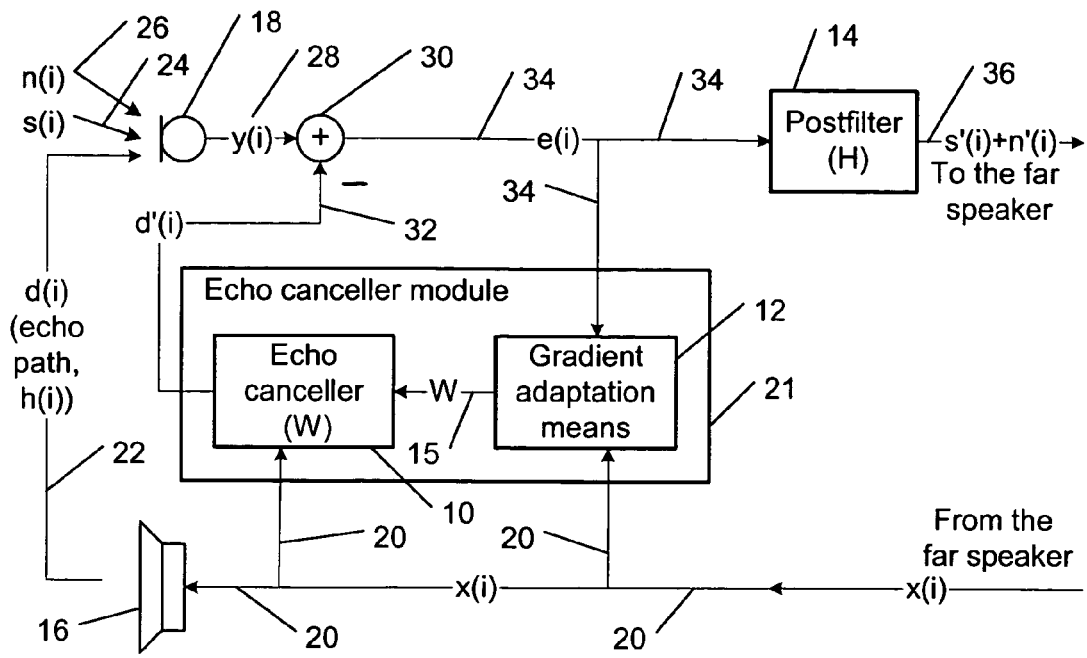
FIG. 1 is a block diagram representing a system for acoustic echo cancellation.

The simple statistical adaptive-filter controller is optimized for the joint control of an echo canceller module 21 and a postfilter 14 of FIG. 1. The joint control of the echo canceller module 21 and the postfilter 14 is not only simpler than the individual optimization of the echo canceller module 21 and postfilter 14, it also delivers more consistent results and a higher output signal quality. The simple statistical adaptive-filter controller is only partially useful for the echo canceller module 21 alone.

Figure 2:
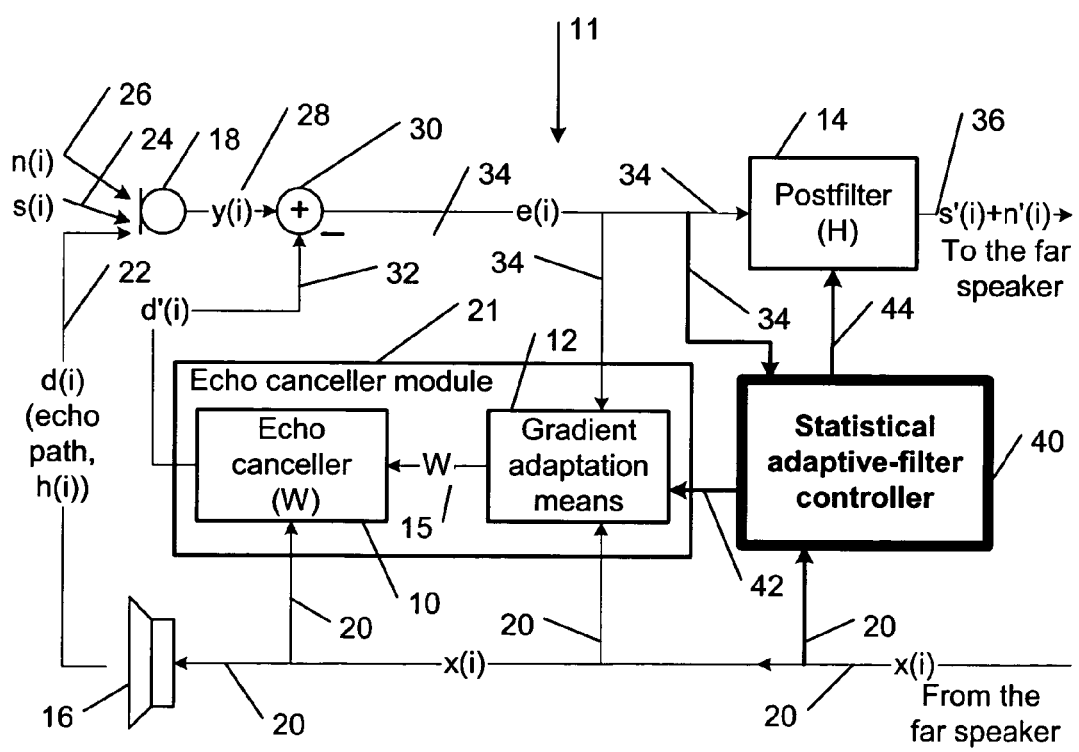
FIG. 2 is a block diagram representing a system for acoustic echo cancellation using a statistical adaptive-filter controller, according to the present invention.

FIG. 2 shows a block diagram representing an acoustic echo cancellation system 11 using a statistical adaptive-filter controller (SAFC) 40, according to the present invention. The SAFC 40 is basically the missing link between the echo canceller module 21 for acoustic echo cancellation and the postfilter 14 for residual echo suppression. The blocks 21 and 14 are described above in regard to FIG. 1. As shown in FIG. 2 the SAFC 40 provides a first control signal 42 to a gradient adaptation means 12 of the echo canceller module 21 and a second control signal 44 to the postfilter 14 to perform fast and robust adaptation even in the presence of a noise n(i). The SAFC 40, according to the present invention, is obtained from a purely statistical optimization process and is therefore extremely simple and robust. As shown in FIG. 2, the SAFC 40 uses a voice signal x(i) 20 and an echo reduced microphone signal e(i) 34 as input parameters.

The first control signal 42 can be a step-size signal which is used to determine according to a predetermined criteria a gradient change of a further control signal 15. According to the present invention, the gradient adaptation means 12 provides the further control signal 15 to an echo canceller 10 of the echo canceller module 21 by determining a gradient of the further controlled signal 15 based on a predetermined criteria using the voice signal x(i) 20 and the echo reduced microphone signal e(i) 34 as input signals (as in FIG. 1), and additionally the first control signal 42 from the SAFC 40.

The second control signal 44 can be a further transfer function signal of a postfilter 14, said further transfer function signal weights an echo reduced microphone signal 34 for generating a high quality undistorted (strongly echo reduced) microphone signal 36. The echo cancellation system 11 can operate in a time domain or in a frequency domain. This implies that the statistical adaptive-filter controller 40, the echo canceller module 21 and the postfilter 14 can operate in the time or frequency domain, and the first and second control signals can be also provided in the time or frequency domain, respectively.

Figure 3:
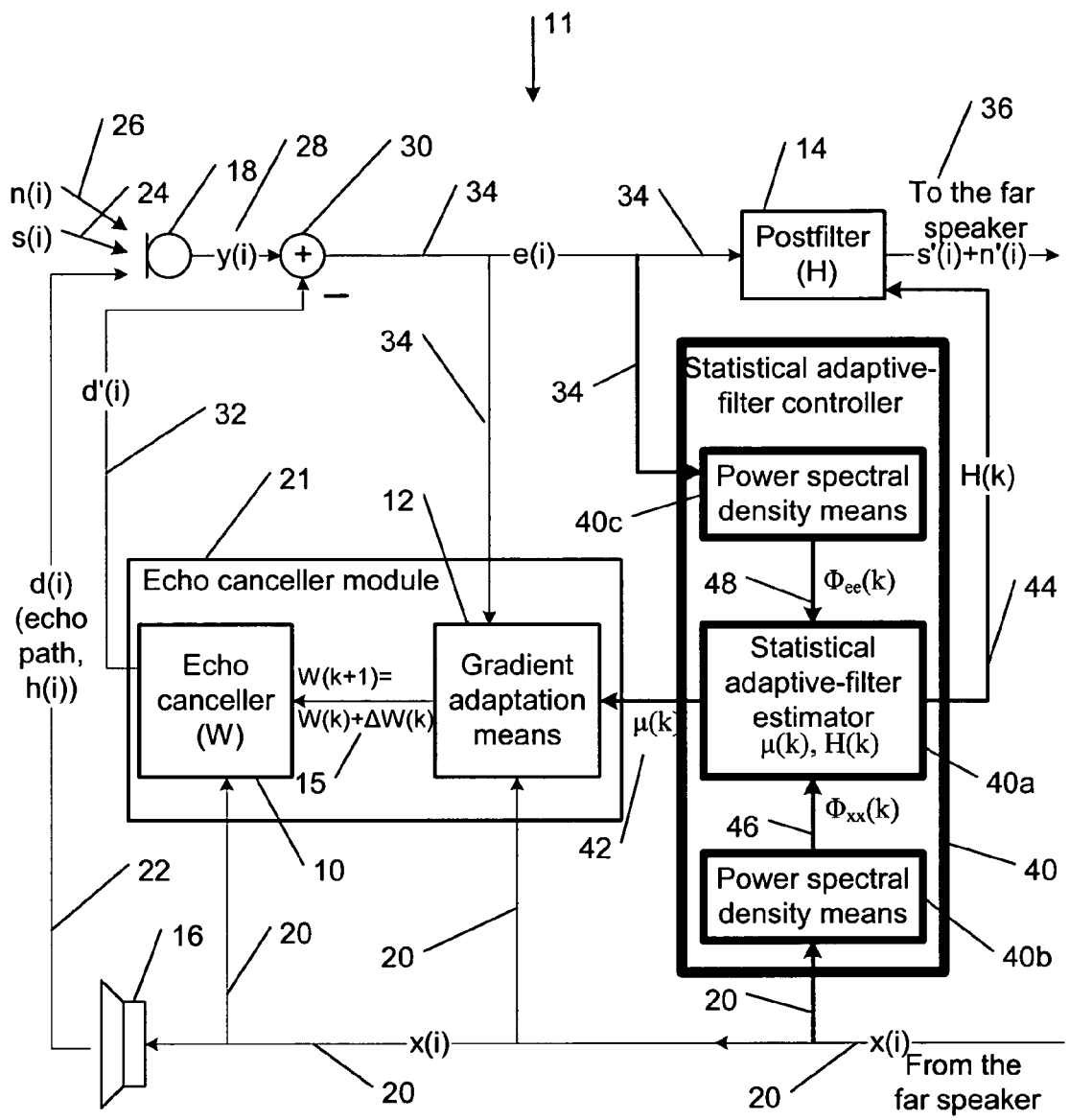
FIG. 3 is a block diagram representing a system for acoustic echo cancellation implemented in the Discrete Fourier Transform (DFT) domain using a statistical adaptive-filter controller, according to the present invention.

FIG. 3 shows an example illustrating a block diagram representing a system for the acoustic echo cancellation implemented in a Discrete Fourier Transform (DFT) domain, according to the present invention. A stream of signal samples is processed on a frame by frame basis in this approach. The signal frames are obtained by the "windowing" operation and "k" is the frame time index. The SAFC 40 provides the step-size signal μ(k) 42 to the gradient adaptation means 12 of the echo canceller module 21. The step-size signal μ(k) 42 is used to estimate a gradient ΔW(k) of the further control signal W(k+1)=W(k)+ΔW(k) 15 according to the amount of observation noise in the microphone as discussed below. The step-size signal μ(k) 42 is thus responsible for the robustness and operation accuracy of the echo canceller 10. The optimum step-size signal μ(k) 42 in a minimum mean-square error (MMSE) sense can be found e.g. in G. Enzner, R. Martin, and P. Vary, in *Partitioned Residual Echo Power Estimation for Frequency-Domain Acoustic Echo Cancellation and Postfiltering*, European Trans. on Telecommunications, vol. 13, no. 2, pp. 103–114, March–April 2002, as the following ratio:

$$\mu(k) = \frac{|G(k)|^2 \Phi_{XX}(k)}{\Phi_{ee}(k)}, \quad (1)$$

wherein $\Phi_{xx}(k)$ and $\Phi_{ee}(k)$ are power spectral density (PSD) signals of the signals x(i) 20 and e(i) 34, respectively, and $|G(k)|^2$ is a residual echo power transfer function corresponding to the residual echo impulse response g(i)=h(i)−w(i), where h(i) and w(i) are impulse responses of an acoustic echo path and the echo canceller 10, respectively.

The SAFC 40 further provides the second control signal 44, a postfilter weights signal H(k) 44, to the postfilter 14 which is to be applied to the echo reduced microphone signal e(i) 34. The postfilter weights signal H(k) 44 is the further transfer function signal (defined in comments to FIG. 2) of the postfilter 14 in the frequency domain. The postfilter weights signal H(k) 44 is responsible for the efficient suppression of the residual echo components in the echo reduced microphone signal e(i) 34, thereby not introducing audible distortions of the useful signal part s(i)+n(i). The optimum postfilter weights signal H(k) 44 in the MMSE sense is given by the Wiener filter in the DFT domain described by $$H(k) = \frac{\Phi_{ee}(k) - |G(k)|^2 \Phi_{XX}(k)}{\Phi_{ee}(k)}. \quad (2)$$

The postfilter weights signal H(k) 44 depends on the same parameters as the step-size signal μ(k) 42, including the residual echo power transfer function $|G(k)|^2$ which is determined below, according to the present invention. It is followed from Equations (1) and (2) that μ(k)+H(k)=1 which is consistent with conclusions of E. Hänsler and G. U. Schmidt, *Hands-Free Telephones—Joint Control of Echo Cancellation and Postfiltering*, Signal Processing, vol. 80, no. 11, pp. 2295–2305, 2000.

It has been observed in the theory and study of adaptive filters (S. Haykin, *Adaptive Filter Theory*, Prentice Hall, 2002; A. Mader, H. Puder, and G. U. Schmidt, *Step-Size Control for Acoustic Echo Cancellation Filters—An Overview*, Signal Processing, vol. 80, no. 9, pp. 1697–1719, September 2000; G. Enzner, R. Martin, and P. Vary, *Partitioned Residual Echo Power Estimation for Frequency-Domain Acoustic Echo Cancellation and Postfiltering*, European Trans. on Telecommunications, vol. 13, no. 2, pp. 103–114, March–April 2002) that it is extremely difficult to find a reliable estimate of the residual echo power transfer function $|G(k)|^2$ required for the implementation of Equations (1) and (2). According to the present invention a simple statistical estimator for $|G(k)|^2$ is used as described in the following paragraphs.

The optimum step-size signal 42 in Equation (1) can be estimated as $$\mu(k) = \frac{|G'|^2 \Phi_{XX}(k)}{\Phi_{ee}(k)} \quad (3)$$

wherein $|G'|^2$ is a pre-selected constant. It can be shown theoretically that the specific choice of the $|G'|^2$ results in an Echo Return Loss (ERL) of −10 log 10($|G'|^2$) dB between the voice signal x(i) 20 and the echo reduced microphone signal e(i) 34. Therefore, the pre-selected value of $|G'|^2$ can be understood as a target convergence (target accuracy) of the echo controller module 21.

Given the step-size signal μ(k) 42 estimated using Equation (3), it is then possible to perform a statistical convergence analysis of the echo canceller 10 along the methodology described by S. Haykin, in *Adaptive Filter Theory*, Prentice Hall, 2002. The result is a time-varying first order difference equation for the residual echo power transfer function $|G(k)|^2$:

$$|G(k+1)|^2 = |G(k)|^2(1-2\mu(k)) + \mu(k)|G'|^2 \quad (4).$$

Equation (4) only depends on the choice of the target convergence $|G'|^2$ and the approximated step-size signal μ(k) 42. Given some initial condition, Equation (4) can be solved recursively at each frame index "k" for the unknown value of the residual echo power transfer function $|G(k)|^2$. The solution can be used to determine the postfilter weights signal H(k) 44 using Equation (2).

The approximation of the step-size signal μ(k) 42 in Equation (3) is extremely simple and therefore the echo canceller 10 is certainly working sub-optimum. Given the sub-optimum echo canceller 10, the postfilter 14, according to Equations (4) and (2) is however statistically nearly optimum in the MMSE sense. Therefore, the postfilter 14 can correct weaknesses of the echo canceller 10 to some extent.

Thus the SAFC 40 shown in FIG. 3 for implementation of an algorithm described by Equations (2)–(4), comprises a first power spectral density (PSD) means 40b which provides a first power spectral density signal $\Phi_{xx}(k)$ 46 of the voice signal x(i) 20, a second power spectral density (PSD) means 40c which provides a second power spectral density signal $\Phi_{ee}(k)$ 48 of the echo reduced microphone signal e(i) 34, and a statistical adaptive-filter estimator (SAFE) 40a which responds to the first and to the second power spectral density signals $\Phi_{xx}(k)$ 46 and $\Phi_{ee}(k)$ 48, respectively, and determines and provides the first and the second control signals 42 and 44 using Equations (2)–(4). The SAFE 40a also pre-selects constant $|G'|^2$. Windowing function for determining signal frames is included in the PSD blocks 40b and 40c.

FIGS. 4a, 4b, and 4c show construction of blocks 10, 12 and 14 of FIG. 3, respectively. Construction of these blocks is well-known to a person skilled in the art and is shown here for illustration. Windowing of the signals x(i) 20 and e(i) 34 is implemented using blocks 50 and 60, and 70 and 80, respectively. DFT is performed by blocks 52, 62 and 82, Inverse Discrete Fourier Transform (IDFT) is performed by blocks 56 and 82, and multiplication operation is performed by blocks 54, 64, 66 and 84, respectively. The gradient of the further controlled signal 15 in FIG. 4b is determined using a normalized least-mean-square (NLMS) type algorithm as the predetermined criteria which can be expressed for example in the DFT domain as $$\Delta W = \frac{\mu(k)E(k)X(k)}{\Phi_{xx}(k)}. \quad (5)$$

The linearization performed by blocks 58, 72 and 88 is used to remove cyclic convolution/correlation components produced by the DFT/IDFT. Blocks 10 and 12 together can also be seen as the Frequency-Domain Adaptive Filter (FDAF) the derivation of which can be found in S. Haykin, *Adaptive Filter Theory*, Prentice Hall, Chapter 7, 2002, and in E. Ferrara, *Frequency-domain adaptive filtering*, in C. Cowan, P. Grant, Adaptive Filters, Prentice Hall, 1985. And finally, block 74 of the gradient adaptation means 12 performs an addition operation to compute the controlled signal 15 required by the echo canceller 10: W(k+1)=W(k)+ΔW (k).

Figure 4:
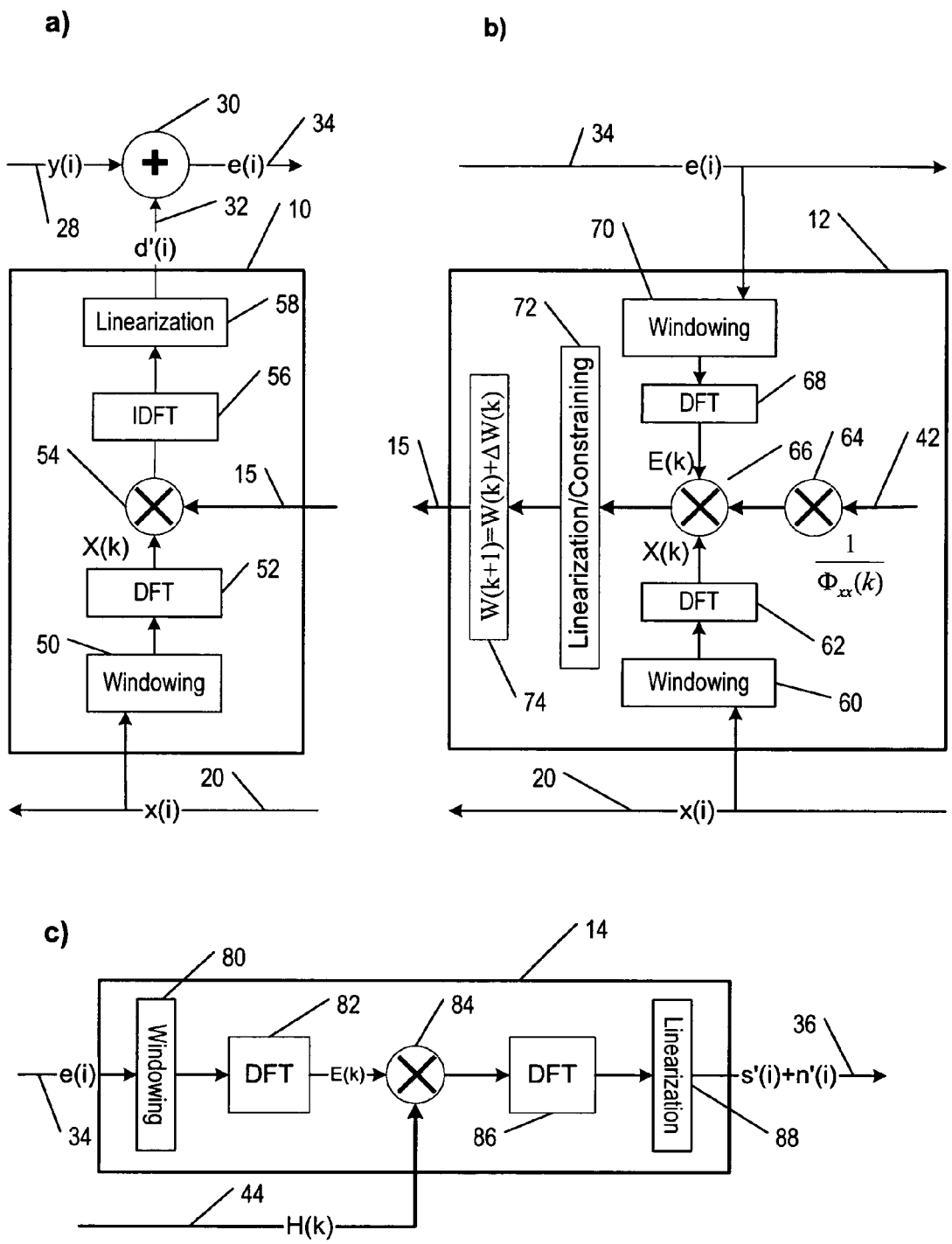
FIGS. 4a, 4b, and 4c show construction of blocks 10, 12 and 14 of FIG. 3, respectively.

FIGS. 3 and 4 illustrate one example for realization of the echo cancellation system 11, according to the present invention. However, there are many possible variations. For instance, in a more advanced realization with some modifications, the solution of the difference Equation (4) could be substituted back into Equation (1) to find yet a better approximation of the optimum step-size signal. The whole structure then supports an even more precise and closed solution to the acoustic echo control problem. The approach as discussed above was basically thought as an intuitive realization example of the present invention. This also implies the steps of operation as shown in FIG. 5.

Figure 5:
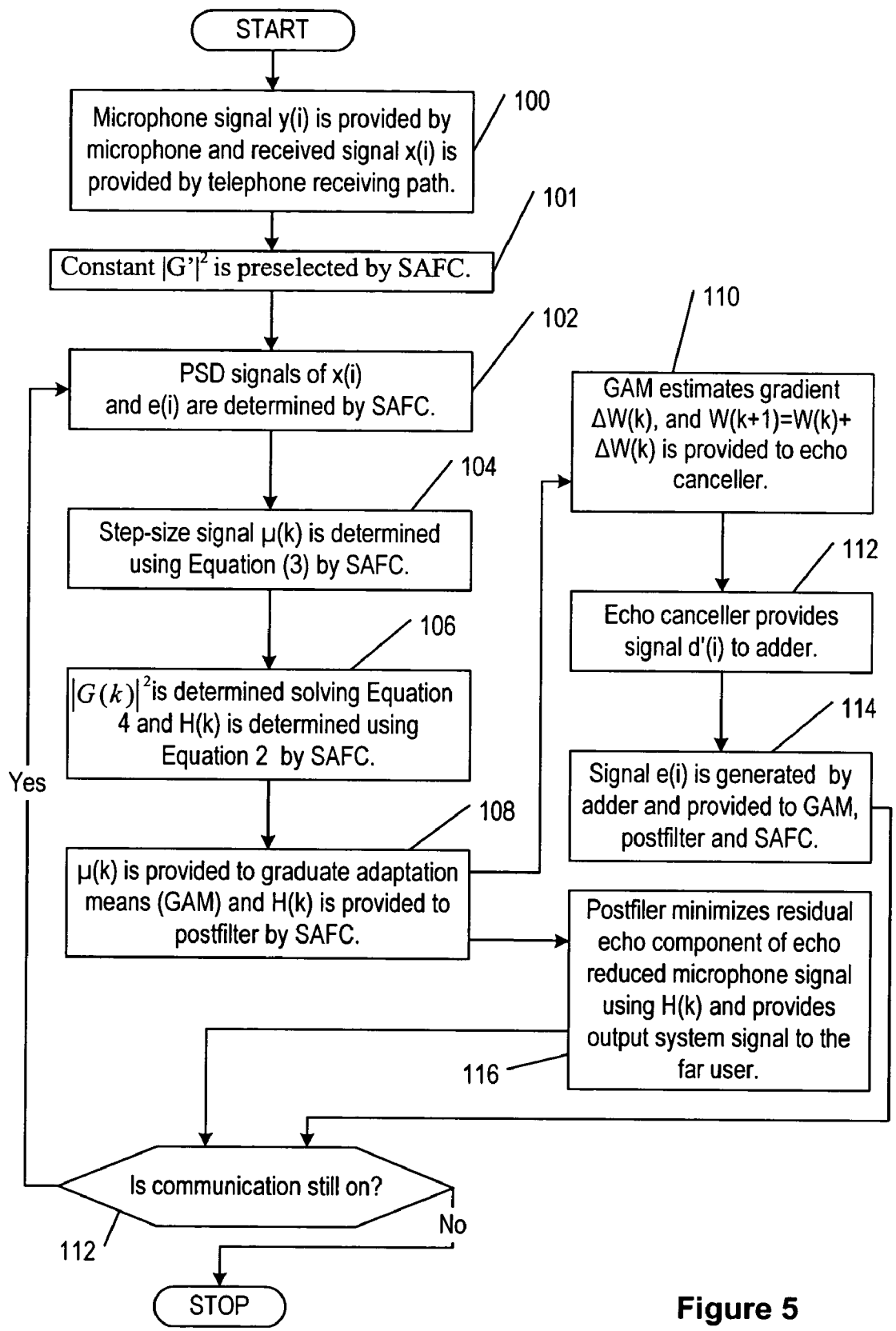
FIG. 5 is a flow chart illustrating a performance of a statistical adaptive-filter controller of FIGS. 3 and 4 to optimize echo cancellation, according to the present invention.

FIG. 5 shows a flow chart illustrating a performance of a statistical adaptive-filter controller of FIG. 3 to optimize echo cancellation. In a method according to the present invention, in a first step 100, a microphone signal y(i) 28, a part of which is the echo signal d(i) 22, is provided by the microphone 18 and the voice signal x(i) 20 is provided by a telephone receiving path. Said echo signal is a microphone response to an acoustic output signal provided by a loudspeaker 16 in response to the voice signal x(i) 20. In a next step 101, constant $|G'|^2$ is pre-selected by the SAFE 40a of the SAFC 40. In a next step 102, the power spectral density signals $\Phi_{xx}(k)$ 46 and $\Phi_{ee}(k)$ 48 of the voice signal x(i) 20 and echo reduced microphone signal 34, respectively, are determined. In a next step 104, the step-size signal μ(k) is determined using Equation (3) by the SAFC 40a. In a next step 106, the residual echo power transfer function $|G(k)|^2$ is determined by solving Equation 4 and the postfilter weights signal H(k) 44 is determined using Equation 2 by the SAFE 40a. In a next step 108, the step-size signal μ(k) 15 is provided to the gradient adaptation means (GAM) 12 and the postfilter weights signal H(k) 44 is provided to the postfilter 14 by the SAFE 40a. After the step 106, the process continues to steps 110 and 116 which initiate two procedures taking place in parallel.

In a step 110, the gradient signal ΔW(k) of the further controlled signal 15 is determined using Equation (5) by the gradient adaptation means 12 which further performs an addition operation W(k+1)=W(k)+ΔW(k) and further provides W(k+1) to the echo canceller 10. In a next step 112, the echo canceller 10 provides the estimate echo signal d'(i) to the adder 30. In a next step 114, the echo reduced microphone signal e(i) 34 is generated by the adder 30 and provided to the GAM 12, to the postfilter 14 and to the power spectral density means 40b of the SAFC 40.

In a next step 116, the postfilter 14 further reduces the residual echo component of the echo reduced microphone signal 34 using the postfilter weights signal H(k) 44 which weights the echo reduced microphone signal 34 for generating a high quality undistorted (strongly echo reduced) microphone signal 36.

After steps 114 and 116, in a next step 120, a determination is made whether communication (e.g., phone conversation) is still on. If not, the process stops. If communication is still on, the process returns to step 102.

What is claimed is:

1. An echo cancellation system (11), comprising:
a microphone (18), responsive to an echo signal (22) from a loudspeaker (16) that provides an acoustic output signal in response to a voice signal (20), for providing an echo signal which is a component of a microphone signal (28); and
a statistical adaptive-filter controller (40), responsive to the voice signal (20) and to an echo reduced microphone signal (34), for providing a first control signal (42) to an echo canceller module (21) and a second control signal (44) to a postfilter (14), wherein said first and second control signals are determined jointly by said statistical adaptive-filter controller and provided for optimizing cancellation of the echo signal in a frequency domain and the first control signal (42) is determined according to:

$$\mu(k) = \frac{|G'|^2 \Phi_{xx}(k)}{\Phi_{ee}(k)},$$

wherein $|G'|^2$ is a predetermined constant and $\Phi_{xx}(k)$ and $\Phi_{ee}(k)$ denote power spectral density signals of the voice signal (20) and of the echo reduced microphone signal (34), respectively, and k is a frame time index.

2. The echo cancellation system (11) of claim 1, wherein the first control signal (42) is a step-size signal which is used to determine a gradient change of an echo transfer function signal (15) provided to an echo canceller (10) of the echo canceller module (21) according to a predetermined criterion.

3. The echo cancellation system (11) of claim 1, wherein the second control signal (44) is a further transfer function signal of the postfilter (14), said further transfer function signal weights an echo reduced microphone signal (34).

4. The echo cancellation system (11) of claim 1, further comprising the postfilter (14), responsive to an echo reduced microphone signal (34) and to the second control signal (44), for providing an output system signal (36).

5. The echo cancellation system (11) of claim 1, further comprising the echo canceller module (21), responsive to the voice signal (20), to the first control signal (42), and to an echo reduced microphone signal (34), for providing an estimated echo signal (32) to an adder (30).

6. The echo cancellation system (11) of claim 5, wherein the echo canceller module (21) comprises an echo canceller (10) responsive to the voice signal (20) and to an echo transfer function signal (15), for providing an estimated echo signal (32) to the adder (30).

7. The echo cancellation system (11) of claim 5, wherein the echo canceller module (21) comprises a gradient adaptation means (12), responsive to the voice signal (20), to the first control signal (42), for providing for an echo transfer function signal (15) to the echo canceller (10).

8. The echo cancellation system (11) of claim 5, further comprising the post filter (14), responsive to an echo reduced microphone signal (34) and to the second control signal (44), for providing an output system signal (36).

9. The echo cancellation system (11) of claim 1, further comprising an adder (18), responsive to a microphone signal (28) and to an estimate echo signal (32), for providing an echo reduced microphone signal (34).

10. The echo cancellation system (11) of claim 1, wherein the statistical adaptive-filter controller (40), the echo canceller module (21) and the postfilter (14) operate in a frequency domain, and said first and second control signals are provided in the frequency domain as well.

11. The echo cancellation system (11) of claim 10, wherein the frequency domain is implemented as a Discrete Fourier Transform (DFT) domain.

12. The echo cancellation system (11) of claim 11, wherein the statistical adaptive-filter controller (40) is further comprising:
 a first power spectral density means (40b), responsive to the voice signal (20), for providing a first power spectral density signal (46) of the voice signal (20);
 a second power spectral density means (40c), responsive to an echo reduced microphone signal (34), for providing a second power spectral density signal (48) of the echo reduced microphone signal (34); and
 a statistical adaptive-filter estimator (40a), responsive to the first and to the second power spectral density signals (46, 48), for providing the first and for the second control signals (42, 44).

13. The echo cancellation system (11) of claim 1, wherein the first control signal (42) is a step-size signal which is used according to a predetermined criteria to determine a gradient change of an echo transfer function signal (15) provided to an echo canceller (10) of the echo canceller module (21).

14. The echo cancellation system (11) of claim 1, wherein the second control signal (44) is a further transfer function signal of a postfilter (14), said further transfer function signal weights an echo reduced microphone signal (34) and it is determined according to:

$$H(k) = \frac{\Phi_{ee}(k) - |G(k)|^2 \Phi_{XX}(k)}{\Phi_{ee}(k)},$$

wherein $|G(k)|^2$ is determined by solution of a difference equation:

$$|G(k+1)|^2 = |G(k)|^2(1 - 2\mu(k)) + \mu(k)|G'|^2.$$

15. An echo cancellation system (11), comprising:
 a microphone (18), responsive to an echo signal (22) from a loudspeaker (16) that provides an acoustic output signal in response to a voice signal (20), for providing an echo signal which is a component of a microphone signal (28); and
 a statistical adaptive-filter controller (40), responsive to the voice signal (20) and to an echo reduced microphone signal (34), for providing a first control signal (42) to an echo canceller module (21) and a second control signal (44) to a postfilter (14), wherein the echo canceller module (21) operates in a time domain and the postfilter (14) operates in a frequency domain, and the first control signal is provided in the time domain and the second control signal is provided in the frequency domain, respectively.

16. A method for acoustic echo control, comprising the steps of:
 providing (100) an echo signal which is a component of a microphone signal (28) of a microphone (18) which is responsive to an echo signal (22) from a loudspeaker (16) that provides an acoustic output signal in response to a voice signal (20); and
 providing (108) a first control signal (42) to an echo canceller module (21) and a second control signal (44) to a postfilter (14) by a statistical adaptive-filter controller (40) which is responsive to the voice signal (20) and to an echo reduced microphone signal (34)
 wherein said first and second control signals are determined provided for optimizing cancellation of the echo signal in a according to:

$$\mu(k) = \frac{|G'|^2 \Phi_{XX}(k)}{\Phi_{ee}(k)},$$

wherein $|G'|^2$ is a predetermined constant and $\Phi_{XX}(k)$ and $\Phi_{ee}(k)$ denote power spectral density signals of the voice signal (20) and of the echo reduced microphone signal (34), respectively, and k is a frame time index.

17. The method of claim 16, wherein the first control signal (42) is a step-size signal which is used to determine a gradient change of an echo transfer function signal (15) provided to an echo canceller (10) of the echo canceller module (21) according to a predetermined criterion.

18. The method of claim 16, wherein the second control signal (44) is a further transfer function signal of a postfilter (14), said further transfer function signal weights an echo reduced microphone signal (34).

19. The method of claim 16, prior to the step of providing (108) the first and second control signals (42, 44), further comprising the step of:
 determining (104, 106) the first and the second control signals by a statistical adaptive-filter controller (40).

20. The method of claim 19, further comprising the steps of:
 determining (112) an estimated echo signal (32) by the echo canceller module (21) using the first control signal provided by the statistical adaptive-filter controller (40); and determining (114) an echo reduced microphone signal (34) by an adder (28) by adding the estimate echo signal (32) to a microphone signal (18).

21. The method of claim 20, further comprising the steps of:

determining (116) an output system signal (36) by the postfilter (14) using the second control signal provided by the statistical adaptive-filter controller (40).

22. An echo cancellation system (11), comprising:

a microphone (18), responsive to an echo signal (22) from a loudspeaker (16) that provides an acoustic output signal in response to a voice signal (20), for providing an echo signal which is a component of a microphone signal (28); and a statistical adaptive-filter controller (40), responsive to the voice signal (20) and to an echo reduced microphone signal (34), for providing a first control signal (42) to an echo canceller module (21) and a second control signal (44) to a postfilter (14), wherein said first and second control signals are provided for optimizing cancellation of the echo signal in a frequency domain, and wherein a residual echo power transfer function $|G(k) K|$, corresponding to a residual echo impulse response $g(i)=h(i)-w(i)$, wherein $h(i)$ and $w(i)$ are impulse responses of an acoustic echo path and an echo canceller (10) of said echo canceller module (21), respectively, is determined by a solution of a difference equation:

$$|G(k+1)|^2 = |G(k)|^2(1-2\,\mu(k)) + \mu(k)|G'|^2,$$

wherein $|G'|^2$ is a predetermined constant, $p(k)$ is the first control signal (42) and k is a frame time index.

* * * * *

UNITED STATES PATENT AND TRADEMARK OFFICE
CERTIFICATE OF CORRECTION

PATENT NO. : 7,054,437 B2 Page 1 of 1
APPLICATION NO. : 10/608785
DATED : May 30, 2006
INVENTOR(S) : Gerald Enzner It is certified that error appears in the above-identified patent and that said Letters Patent is hereby corrected as shown below:

In column 10, line 36, claim 16, line 15 after "determined" --jointly by said statistical adaptive-filter controller and-- should be inserted.

In column 10, line 37, claim 16, line 16 after "in a" --frequency domain and the first control signal (42) is determined-- should be inserted.

In column 12, lines 5 and 6, claim 22, lines 14 and 15 " I G(k) K I," should be --I G(k) I,--.

In column 12, line 14, claim 22, line 24 "p(k)" should be -- μ (k)--.

Signed and Sealed this

Fifth Day of December, 2006

JON W. DUDAS
*Director of the United States Patent and Trademark Office*